United States Patent
Ottosson

(10) Patent No.: US 9,756,835 B1
(45) Date of Patent: Sep. 12, 2017

(54) PET MEMORY AND AGILITY EXERCISE BOARD GAME

(71) Applicant: Nina Ottosson, Karlskoga (SE)

(72) Inventor: Nina Ottosson, Karlskoga (SE)

(73) Assignee: THE Kyjen Company LLC, Centennial, CO (US)

( * ) Notice: Subject to any disclaimer, the term of this patent is extended or adjusted under 35 U.S.C. 154(b) by 0 days.

(21) Appl. No.: 15/627,379

(22) Filed: Jun. 19, 2017

(51) Int. Cl.
*A01K 15/02* (2006.01)
*A01K 5/01* (2006.01)
*A63F 9/06* (2006.01)

(52) U.S. Cl.
CPC .......... *A01K 15/026* (2013.01); *A01K 5/0135* (2013.01); *A63F 9/0601* (2013.01)

(58) Field of Classification Search
CPC .... A01K 15/025; A01K 15/021; A01K 15/02; A01K 15/027; A01K 29/005; A01K 5/0114; A63F 9/0601
USPC .......... 119/707, 702, 51.01, 706, 51.02, 711, 119/417, 421, 703, 708, 905; 446/170; D30/160
See application file for complete search history.

(56) References Cited

U.S. PATENT DOCUMENTS

| | | | | |
|---|---|---|---|---|
| 5,544,623 A | * | 8/1996 | Udelle | A01K 15/025 119/706 |
| 5,673,652 A | * | 10/1997 | Witte | A01K 15/025 119/707 |
| 5,809,938 A | * | 9/1998 | Baiera | A01K 15/025 119/707 |
| 5,870,971 A | * | 2/1999 | Krietzman | A01K 15/025 119/707 |
| 5,875,736 A | * | 3/1999 | Udelle | A01K 15/025 119/706 |
| 6,405,682 B1 | * | 6/2002 | Simon | A01K 15/025 119/707 |
| 7,621,235 B2 | * | 11/2009 | Genitrini | A01K 15/025 119/706 |
| D676,619 S | * | 2/2013 | Hansen | D30/121 |
| 8,418,657 B2 | * | 4/2013 | Dixon | A01K 15/025 119/707 |
| 8,434,428 B2 | * | 5/2013 | Reiter | A01K 15/027 119/702 |
| D755,446 S | * | 5/2016 | Hansen | D30/121 |
| 9,648,854 B1 | * | 5/2017 | Reiter | A01K 15/027 |
| 2009/0095229 A1 | * | 4/2009 | Plante | A01K 15/025 119/707 |
| 2010/0275855 A1 | * | 11/2010 | Ottosson | A01K 5/0114 119/707 |
| 2011/0253059 A1 | * | 10/2011 | Wong | A01K 15/025 119/702 |
| 2012/0240863 A1 | * | 9/2012 | Araujo | A01K 5/02 119/51.01 |
| 2015/0223433 A1 | * | 8/2015 | Navawongse | A01K 29/005 119/421 |
| 2016/0007565 A1 | * | 1/2016 | Trottier | A01K 5/02 119/51.02 |

* cited by examiner

*Primary Examiner* — Yvonne Abbott-Lewis

(57) ABSTRACT

The invention is a novel multi-layered pet memory and agility exercise board game which challenges a pet's memory and agility to solve the game by manipulating parts to retrieve treats or kibble inserted within a plurality of tracks which may be covered by flaps or blocks, and wherein the grooved tracks contain compartments for treats to be concealed within the board game base.

7 Claims, 4 Drawing Sheets

PET MEMORY AND AGILITY EXERCISE BOARD GAME

FIELD

The present invention relates generally to stimulating, encouraging and motivating games and methods of playing regarding pets, e.g. dogs and cats. More particularly, the invention relates to motivational games, toys and methods for assessing the pet training skills in the form of board games and a pet board game detail adapted to be used with such board games.

PRIOR ART

Attempts have been made to combine toys and functions where the pet must perform an action to reach the goal, and where the goal is to get a treat out of the toy by performing some action. By way of example, reference can be made to U.S. Pat. No. 6,073,581. In this category, board games for pets have been developed. However, board games in the prior art have shown to present some disadvantages. Further, Applicant refers to its own U.S. Pat. No. 8,316,804 wherein base pieces may have grooved tracks with moveable pieces associated, this toy and method does not contain slidable fins which may expose treats in a compartment thereunder, or to conversely lock a center spinning top. The '804 Patent does not provide for a notched spinning top piece which aligns with one grooved track at a time to allow or prevent movement of the circular blocks within a track, nor does the '804 Patent provide for fin pieces to slidably expose treat compartments or conversely lock the center spinning top piece when the fins are slid inward on the game board.

Present board games for pets are often made of materials which make them rather expensive to produce. Further, since many pets will chew and generally play rough with the toys, the design and choice of materials make most pet board games prone to quickly degenerate both in shape and in function, e.g. materials such as wood or rope or fabric/textile which do not in the long run resist bites, scratches due to sharp teeth, or claws of the pet. Moreover, certain aspects of the board games are subject to damage by saliva of the pet, and are not always easy to clean.

BRIEF DESCRIPTION OF THE INVENTION

The object of the present invention is to produce and eliminate or at least minimize the abovementioned drawbacks, which, according to one aspect of the invention is achieved by means of a pet board game detail according to the claims.

The present inventive board game may be produced cost efficiently in both materials and production costs. The inventive board game is easy to clean as a result of the material and shape. The standardized shape allows for larger production series, which also makes exchange or replacement of the pet board game parts easy.

Further advantages and aspects of the invention will be evident from the detailed description below. Further the detailed description includes other new aspects, e.g. new board games, combinations of details and board games and new details that may be made the subject for separate divisional applications.

BACKGROUND OF THE INVENTION

The invention most closely corresponds with USPTO Class 119/707 wherein Class 119 relates to animal husbandry and sub-class 707 includes toys, lures, fetch and related devices.

In its simplest form, the invention relates to a novel board game for pets which is constructed of materials that make the game easy to manufacture, and last longer than prior art board games.

SUMMARY, OBJECTS AND ADVANTAGES

It well known that dogs do experience a sense of boredom, and if not addressed, may manifest in negative behavior such as chewing furniture or going to the bathroom in undesirable locations in the pet owner's home. The inventive board game addresses not only the dog's curiosity, it requires the dog to exhibit learned behavior. The dog must learn that to obtain a treat kibble it must do so by manipulating slides and knobs located on the board game. When a slide is moved in one direction, for example, a sliding cover exposes a treat kibble that has been placed in a hollow track beneath the cover.

Similar to Alzheimer's disease in humans, Canine Cognitive Dysfunction manifests in dogs primarily affecting memory, learning and comprehension. As with humans, there are exercises that are said to help stimulate and thus help avoid this dysfunction. Most certainly, entertained and challenged dogs are more alert and content than those who are not stimulated sufficiently.

The inventive board game is comprised of a base with hollow tracks, or channels, wherein swivel "flippers" cover a treat receptacle which must be manipulated by a dog to obtain the treat beneath. The flippers also serve to lock a spinning top in the center of the board game. The center top can be spun to an opening of a treat track, and locked in whereby only treats in that particular track are retrievable by the dog. Circular scoot blocks are also located in the various tracks wherein their function is to allow a user to slide the pieces in the track to add a treat, and for the dog to slide to reveal a treat within that particular track, or wherein additional treats can be inserted into holes in the center of the scoot blocks. There are essentially 3 layers to the board game as will be shown in the Figures.

BRIEF DESCRIPTION OF THE DRAWINGS

The invention is described in further detail by reference to four (4) drawings sufficient in detail to describe the invention in which.

DETAILED DESCRIPTION, INCLUDING BEST MODES OF CARRYING OUT THE INVENTION

Figure 1:
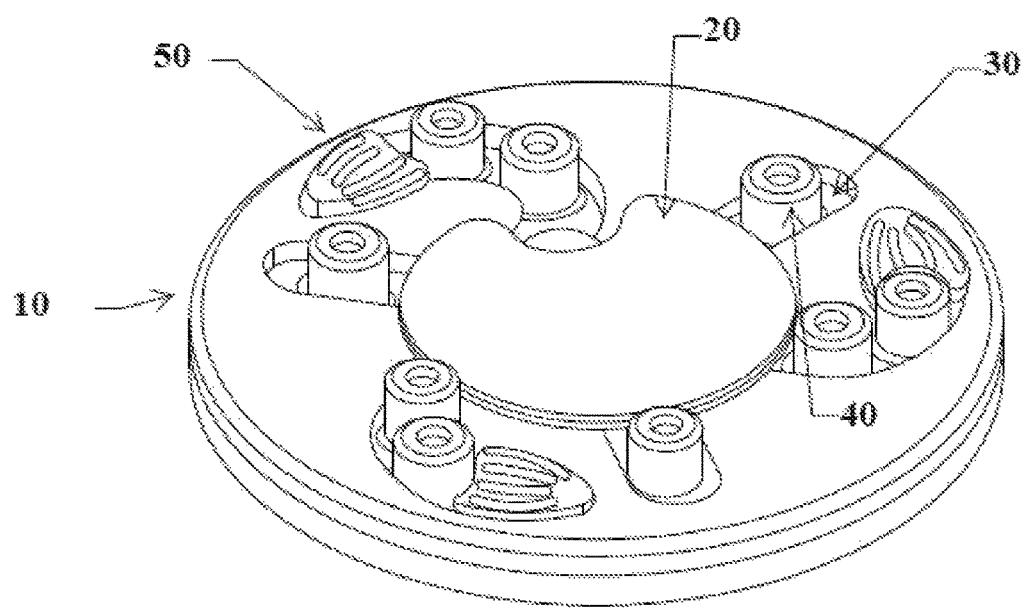
FIG. 1 is a top angled perspective of the board game.

FIG. 1 is shows the entire board game including the base piece 10 with the moving parts associated therewith. The center spinning top 20 is rotatable on an axis to block or allow tracks 30 to be utilized. Within each track is one or more circular scoot blocks 40 with holes in each center to hold a treat, and which are slidably moveable within a track to expose or hide a treat a user has inserted. When a dog slides a circular scoot block from one position to another, a treat may be located within an insert relative to the track and beneath the block. Flippers 50 are slidably rotatable on an axis to both hide a treat in a track insert, and to lock the spinning center piece into one position either blocking or revealing a path through a track. When the flippers 50 are rotated inward, a portion thereof will hold the spinning center top in place. The circular scoot blocks 40 also allow or prevent movement within a track whereby they may be slid from one position to another by a dog to reveal a treat.

Figure 2:
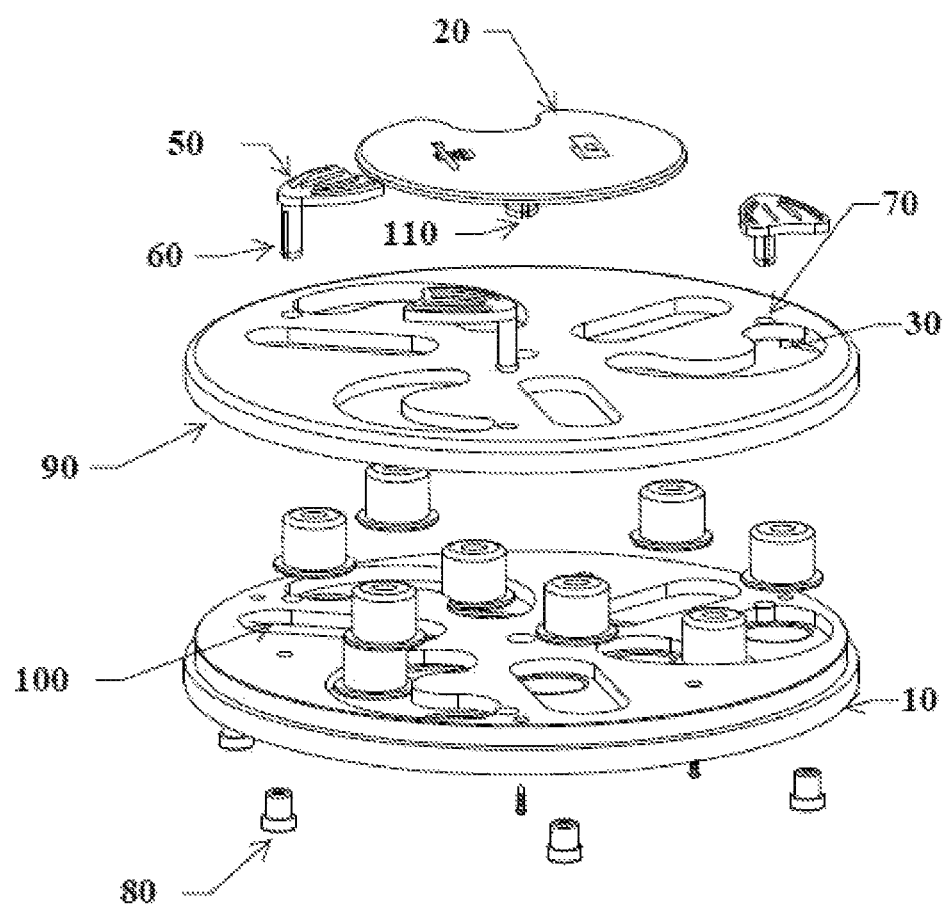
FIG. 2 is an exploded view of the board game.

FIG. 2 is an exploded view of the board game and moving parts therein. The general base piece 10 is shown along with feet 80 intended to keep the game from sliding on a surface, wherein the feet may have rubber or a similar material to prevent sliding. The second level of the base piece 90 provides track guides 30 which match tracks in the general base piece 100. The flippers 50 have a protruding circular tab 60 which then extend down through apertures 70 that sit in corresponding apertures in the base piece 10. This construction allows the flipper to be rotated on an axis to reveal treats to wither lock the center spinning top 20, or allow a dog to access a treat which is located in the lower track 20 of the base.

Further to FIG. 2, the spinning top piece 20 has a circular protruding tab 110 which fits within an aperture that extends through the first base piece 90 to the second 10 base piece in order to allow the spinning top piece to rotate on an axis.

Figure 3:
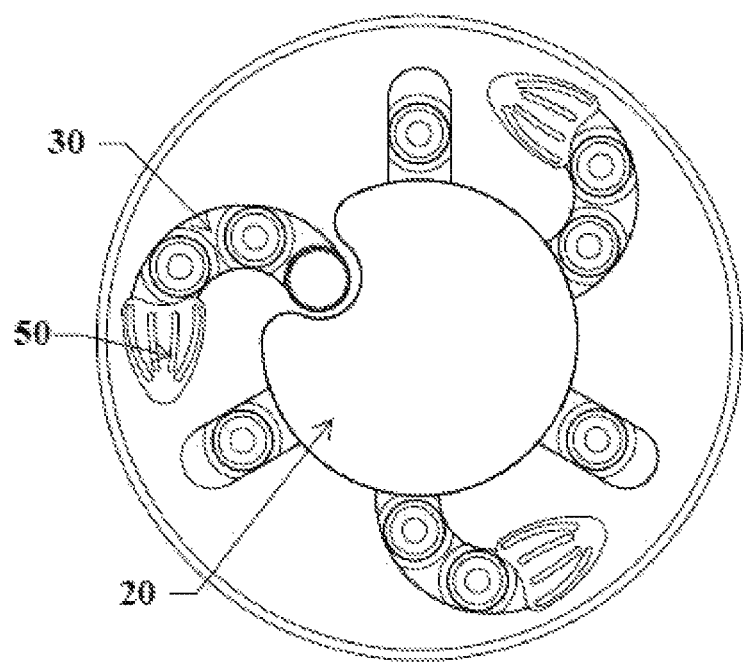
FIG. 3 is a top-down aerial view of the board game.
Figure 4:
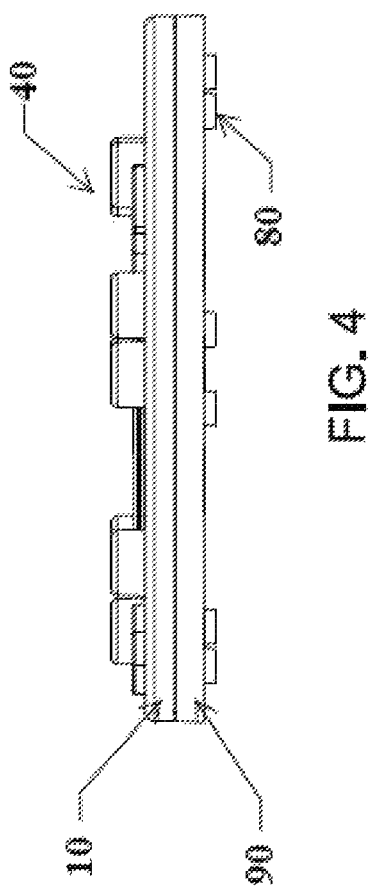
FIG. 4 is a side perspective of the board game.

FIG. 3 is a top view of the second level of the game board 90 illustrating the center spinning top 20 in a position that allows a track to be opened or clear for the circular scoot blocks 40 to be moved in the track 30 to either conceal or reveal a treat placed thereunder. The flippers 50 are shown in an open position, or such that the center spinning top piece is unhindered and may be spun freely.

FIG. 3 is a side perspective illustrating the first 10 and second layers 90 of the board game. A side view of the feet 80 on the base piece is also shown. This Figure also illustrates a side view of the circular scoot blocks 40.

The invention claimed is:

1. A multi-layered pet memory and agility exercise board game with a plurality of inset tracks with compartments therein, a slidable top, and moveable blocks comprising:
   a) A first plastic base piece with grooved tracks and inset compartments within the tracks, and which is attached via snap fit to a second plastic base piece with grooved track openings;
   b) A plurality of moveable circular blocks with holes in each center for treat insertion and for sliding said blocks within a track and a track opening in the base pieces;
   c) Indented compartments in the tracks to allow kibble or treats to be inserted therein and be covered by the blocks;
   d) A top spinning piece which slidably rotates on an axis to either impede or allow movement within the grooved tracks via a notch in one side of the top piece;
   e) At least three fin pieces which slidably rotate on an axis to conceal treats inserted in a track groove, and which fins may be alternately positioned to prevent the top spinning piece from moving; and
   f) Rubber or non-slip material feet located on the underside of the first base piece to prevent the board game from sliding, and wherein the non-slip material covers screws which attach the feet to the base.

2. A multi-layered pet memory and agility exercise board game as in claim 1 wherein the first base piece makes up a lower level of the game board, and has a plurality of grooved tracks wherein the grooved tracks align with grooved track openings on the second base piece.

3. A multi-layered pet memory and agility exercise board game as in claim 1 wherein a second base piece snaps to the first base piece and creates a flush seal, and wherein the second base piece contains track openings which align with grooved tracks in the first base piece.

4. A multi-layered pet memory and agility exercise board game as in claim 1 wherein circular blocks are slidably moveable within each of the grooved tracks in the first base piece, and the track openings located in the second base piece, wherein each block has a hole in the center for inserting treats into the blocks in addition to compartments in the track of the base piece.

5. A multi-layered pet memory and agility exercise board game as in claim 1 wherein a top piece which rotates on an axis created by a circular tab protruding from the top piece fits into an aperture below center, and wherein a cutout notch is located at one point on the spinning top piece which may be slid into alignment with a track to obstruct the remaining tracks in the base pieces, wherein the circular blocks may be slid within the open track when the top piece notch is aligned with that track.

6. A multi-layered pet memory and agility exercise board game as in claim 1 wherein at least three (3) fin shaped pieces are slidably rotated on an axis created by circular protrusions on the underside that fit into receptacles in the base pieces therefor; and wherein the fins may be slid open to expose treats within a compartment in the base below, and to conversely all slide inwards to lock the spinning top piece into a fixed position.

7. A multi-layered pet memory and agility exercise board game as in claim 1 wherein rubber or anti-slip material create anti-slip feet by first having screws attached to the first base piece, and wherein the screws are then covered by rubber or other anti-slip material to prevent the board game from sliding on a surface.

* * * * *